United States Patent Office 3,270,345
Patented August 30, 1966

3,270,345
ELECTRONIC CHANNEL GUIDANCE SYSTEM
Peter P. Schauffler, 101 W. Springfield Ave.,
Philadelphia 18, Pa.
Filed Nov. 5, 1963, Ser. No. 321,477
23 Claims. (Cl. 343—112)

This invention relates to navigation of vessels in narrow channels and sea lanes under conditions of reduced visibility and particularly relates to methods and means for automatically indicating in the pilot house at all times the location, speed and attitude of a vessel as it progresses along a channel.

There has long been recognized the need of providing better information on the position of ships with respect to their channels, particularly in crowded ocean approaches and in rivers and bays leading to inland ports. Prior arrangements involving radio direction-finders or underwater signaling systems have left much to be desired; their objective has generally been to maintain a heading toward or away from a single point whereas a vessel can wander from its channel even though the bow or stern be continually pointed toward the source of a homing signal. Where such systems have involved radar, the costs and complications of installation and operation have severely restricted their adoption.

In the present invention, range stations of radio or underwater sound type are located at every place where the channel undergoes a substantial change of direction and are operated in pairs. The paired signals of a range are detected aboard ship by two pairs of laterally-spaced receivers. As long as the vessel is on course, the signals are received simultaneously. As the vessel turns or moves out of position, however, the signals arrive at one receiver of a pair earlier than at the other; and the difference is utilized together with distance information to provide a visual indication of the vessel's course, speed, progress and offset from the base line between the range stations.

In accordance with this invention, phase-locked signals are transmitted from fore and aft range stations. A signal arrival timing arrangement on the vessel (using phase-comparison or pulse-timing) continuously determines the simultaneous relative bearings of the two stations; and a progress-measuring apparatus continuously registers the vessel's true speed and distance from each of the stations. By thus knowing the distance to and the bearing of each station, the system continuously indicates the lateral offset of the vessel from the base line connecting the two stations and the direction in which the vessel must turn to achieve or maintain the desired offset.

A system embodying the aforesaid elements overcomes the visual navigation problems ordinarily imposed by fog, mist, haze, snow and heavy rain; and vessels may proceed through channels of considerable complexity with full knowledge of their position at all times. This system, furthermore, provides a combination of high accuracy, simplicity, economy, dependability, portability of receiver-indicator equipment, and convenience of presentation.

For further objects and advantages of the invention and additional features thereof, reference is to be had to the following detailed description and to the accompanying drawings in which.

Figure 1:
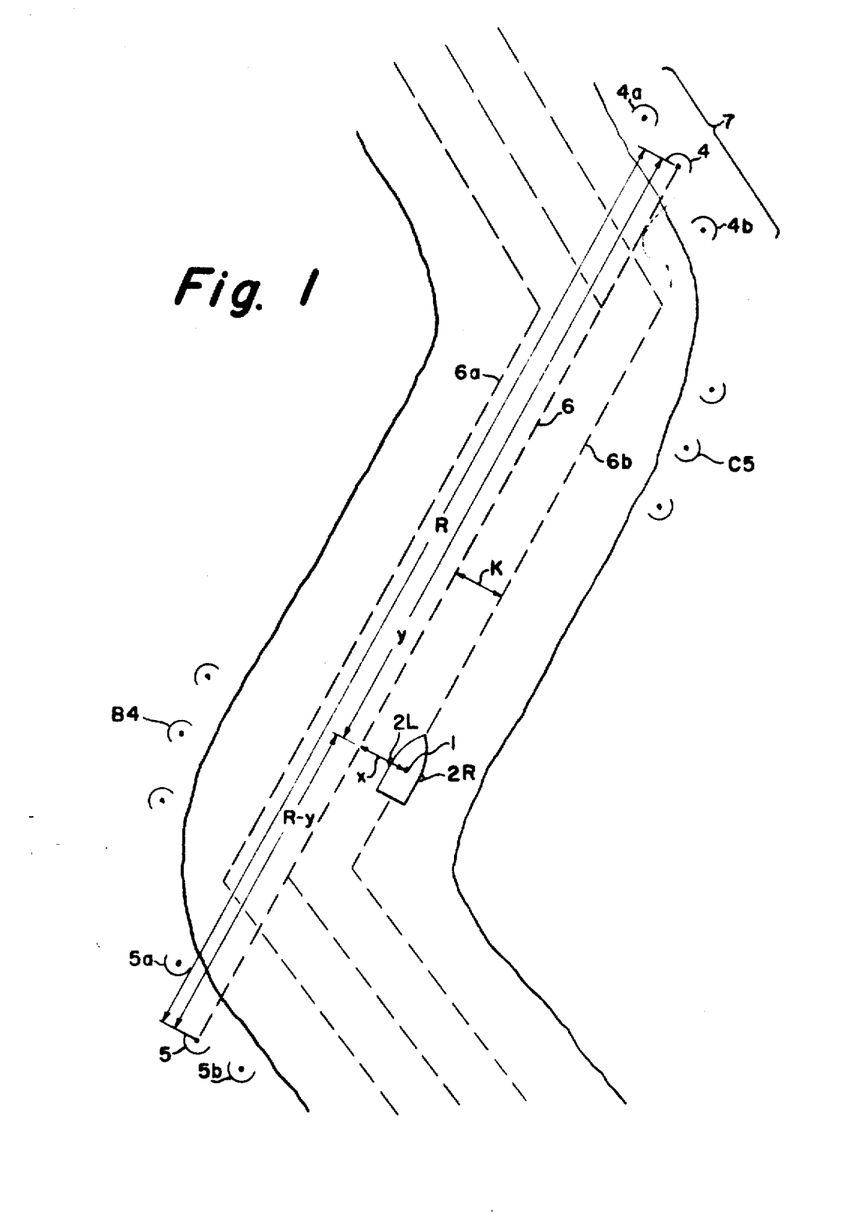
FIG. 1 is an explanatory figure referred to in discussion of the general geometric relationships between vessel position and radio range station locations for a typical channel range.
Figure 2:
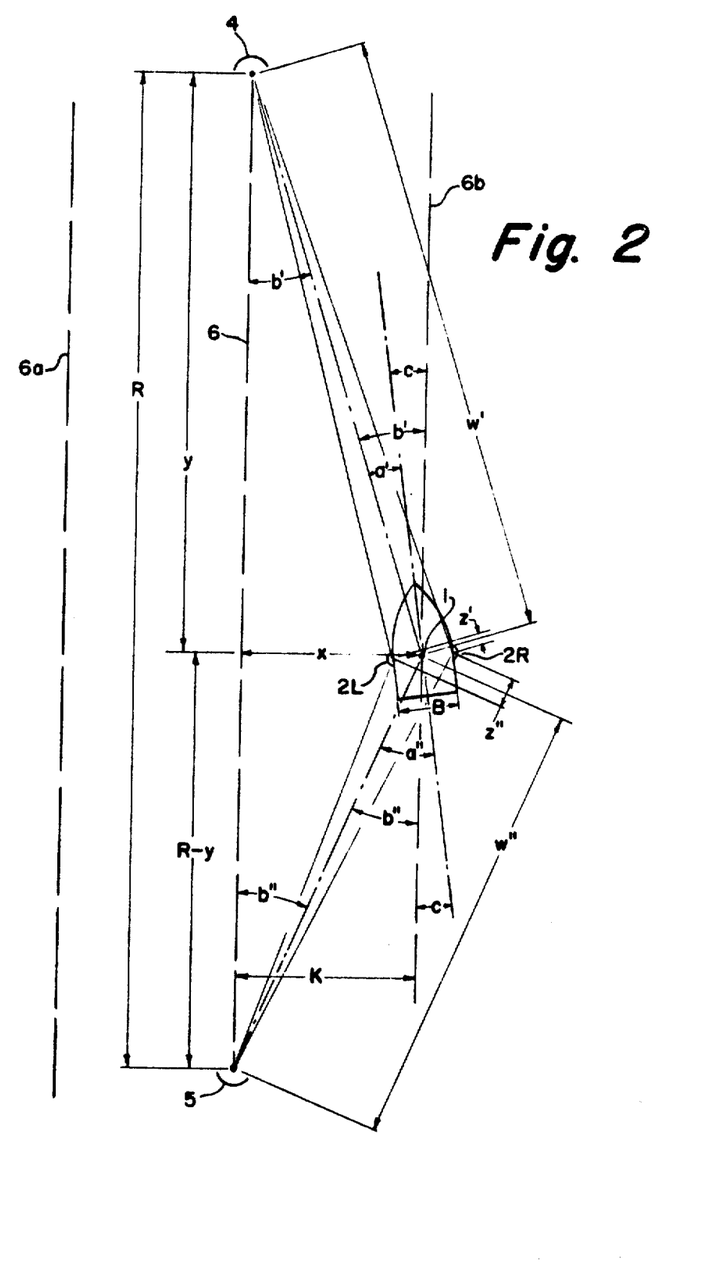
FIG. 2 is an explanatory figure referred to in discussion of the detailed geometric relationships between vessel location and attitude and radio transmitter and receiver antenna locations.

Referring first to FIGS. 1 and 2 to describe the method employed in this system, each pair of range or beacon stations 4, 5 comprises microwave radio transmitters located on land (or on towers or buoys extending above the water surface), one at each end of the projected base or center line 6 of each channel range 7. Where the channel is so equipped, one station in each pair can make use of the beacon-light range stations operated by the United States Coast Guard; and the existence of towers and power sources for these light ranges can greatly simplify the installation of the radio-range stations. The achievable accuracy of the offset indication is such that channel traffic in both the ingoing and outgoing lanes 6a and 6b can use the same channel center line 6 as a reference, navigating in each case to maintain a specified offset to the right of the center line in the direction of travel.

The ship's attitude at all times is defined by the relative bearing $a'$, $a''$ of the beacons; and the ship's location at all times is defined by the lateral offset $x$ from the channel center line 6 and by the distances $y$, $R-y$ from the fore and aft range stations 4,5 measured along the center or base line 6.

Determining on board the vessel the fore and aft relative bearings $a'$ and $a''$ of range stations 4 and 5 respectively, involves an instantaneous phase comparison between the energy from each station as received by antennas 2L, 2R at laterally spaced points between or on opposite sides of the vessel and connected to indicator apparatus in the pilot house 1.

As may be deduced from FIG. 2, the fore and aft relative bearings $a'$ and $a''$ are equal to $$\sin^{-1}\frac{z'}{B}$$

and $$\sin^{-1}\frac{z''}{B}$$

respectively, where $z'$ and $z''$ represent the difference in distance of the two receiving antennas 2L and 2R from the fore and aft range stations 4 and 5 respectively, and B equals the distance between the laterally spaced receiving antennas (essentially the vessel's beam in the schematic showing). The values of $z'$ and $z''$ can be represented by voltages produced by an instantaneous phase comparison by means described hereinafter; the division by B can be accomplished by coupled non-linear (hyperbola-tapered) potentiometers set by hand for the characteristics of any particular vessel installation; and the take-off voltages of the potentiometers can be applied to non-linear (sine-tapered) voltmeters to indicate simultaneously the relative bearings of the fore and aft range stations respectively.

Determining on board the vessel its true speed and distance $y$ and $R-y$ from the fore and aft range stations 4 and 5 respectively involves a successive phase comparison between the phase-locked modulation of the energies simultaneously received from both range stations and a counting and timing of the successive in-phase points, each such point representing a unit of distance.

The stable-frequency amplitude modulation of the microwave radiation from one range station (master) is used as by means described hereinafter, to modulate the microwave carrier from the other station (slave) in the pair. The progress of the vessel between the range stations causes the phase-locked modulation of the energies from the two stations to move successively into and out of phase, the distance between consecutive in-phase or coincidence points being a constant equal to one-half the wavelength of the modulation. As by means described hereinafter, the voltage peaks from a successive phase comparison of the phase-locked modulations from the two stations are used to trigger a counter which registers the vessel's continuous progress between the stations in either direction. The level of recovery of the trigger between successive peaks can be used by means described hereinafter to register the vessel's true speed. By coupling the counter to two potentiometers, the distance to the forward and rear stations can be represented as voltages and applied to the offset computer as described hereinafter.

Determining on board the vessel its lateral offset from the base line between the range stations involves a continuous combination of the above distance information and the algebraic sum of the above bearing information.

Referring to FIG. 2, $x$, $y$, $R-y$, B, $a'$, $a''$, $z'$ and $z''$ are defined as above, $c$ is equal to the angle between the vessel's heading and the lane center line 6b (and channel center line 6), and $w'$ and $w''$ are the straight-line distances from the pilot house to the fore and aft range stations 4 and 5 respectively.

It can be seen from FIG. 2 that $$b' = a' + c \text{ and } b'' = a'' = c$$

and therefore that $$b' + b'' = a' + a''$$

It can also be seen that $$x = w' \sin b' \text{ and } x = w'' \sin b''$$

and also that $$y = w' \cos b' \text{ and } R - y = w'' \cos b''$$

For the typical range configuration where the perpendicular distance between the center line 6 and the lane line 6a or 6b is only a minor fraction of the distance between range stations and the angles $b'$ and $b''$ are therefore small, these latter relationships can be approximated as:

$$x \doteq w'b'; \quad x \doteq w''b''$$
$$y \doteq w'; \text{ and } R - y \doteq w''$$

Therefore $$b' + b'' \doteq \frac{x}{w'} + \frac{x}{w''}$$
$$\doteq x\left(\frac{w' + w''}{w'w''}\right) \doteq x\frac{R}{y(R-y)} \doteq a' + a''$$

and $$x \doteq \frac{y(R-y)(a'+a'')}{R}$$

As can also be seen from FIG. 2

$$z' = B \sin a' \text{ and } z'' = B \sin a''$$

For the small relative bearing angles that are characteristic of the typical channel range, these relationships can be approximated $z' \doteq Ba'$ and $z'' \doteq Ba''$.

If the algebraic sum of $z'$ and $z''$ is represented as $z$ (when measuring $a'$ to the left and $a''$ to the right respectively from the vessel's center line), it can be seen that $$a' + a'' \doteq \frac{z}{B}$$

and therefore, finally, that $$x \doteq \frac{yz(R-y)}{RB}$$

As by means later herein described, the algebraic sum of the relative bearing voltages described above can be combined with the voltages produced by the distance counter as described above to produce, through a simple computer, a voltage which continuously reflects the relationship $yz(R-y)/RB$ and thus represents the vessel's lateral offset from the channel center line; and this voltage can be applied to an appropriately calibrated offset meter. By use of a sine-tapered adjustment for range length as described hereinafter, the voltages applied to the offset meter can be compensated for the major values of relative bearing occurring at the ends of the range in which the above approximations $x \doteq w'b'$ and $x \doteq w''b''$, $y \doteq w'$ and $R - y \doteq w''$, and $z' \doteq Ba'$ and $z'' \doteq Ba''$ gradually lose their validity.

As a final important assistance to the navigator, this same $x$ voltage can be compared, as through an amplifier and a zero-centered course-keeping meter, with a D.C. voltmeter set by hand to represent the desired value of $x$ (the established distance K between the channel center line and lane center line). The course meter deflections will thus give an immediate indication of the direction the vessel must turn in order to achieve or maintain a course along the established lane center line 6a or 6b.

The radio system of FIGS. 3 to 7 preferably makes use of microwave carrier signals to achieve high orders of accuracy and to avoid interference with crowded UHF bands; these signals are amplitude-modulated (single sideband) to provide the wavelength required for the measurement circuits. The transmitter antennas 83 are preferably equipped with small parabolic reflectors to concentrate the beams along the channel center line 6 so to reduce the power requirement for a given signal strength along the range and the possibility of interference between neighboring ranges, in part indicated by range stations B4, C5 of FIG. 1. For short ranges, the antenna height on the range tower should be low to minimize line-of-sight propagation beyond the corresponding range.

The station for each range (FIG. 4) employs two klystrons, magnetrons or similar microwave sources 15, 16 whose output frequencies differ by the modulation-frequency M (say 60 mc.) and are locked apart by a phase-lock loop comprising, for example, a phase comparator 13 which combines the beat frequency of the two klystrons with either the output from a stable modulation-frequency oscillator 11m (FIG. 4A) for the master station or the output from the receiver-detector 11S (FIG. 4B) for the slave station.

Figure 4:
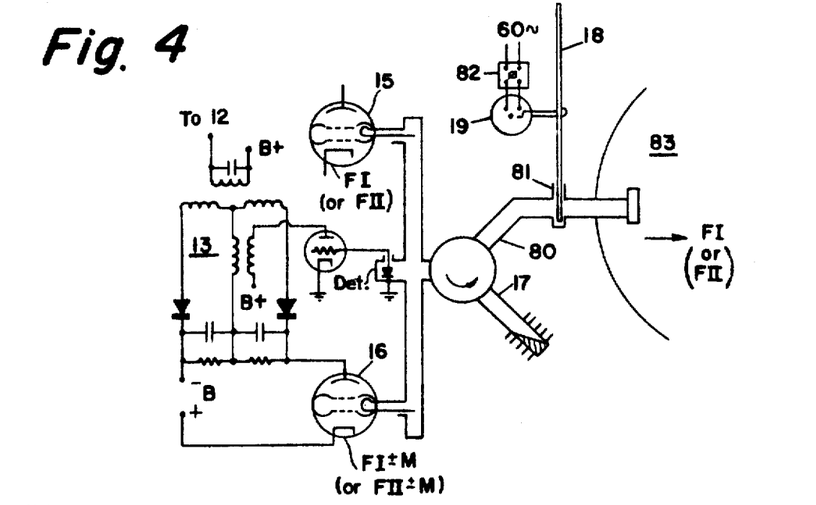
FIG. 4 schematically illustrates suitable circuit elements of the radio range stations.
Figure 4A:
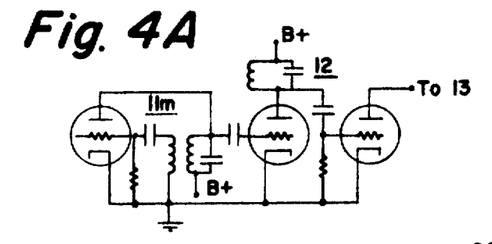
FIGS. 4A, 4B schematically illustrate the modulation-frequency circuitry for the master and slave transmitters of the respective stations.
Figure 4B:
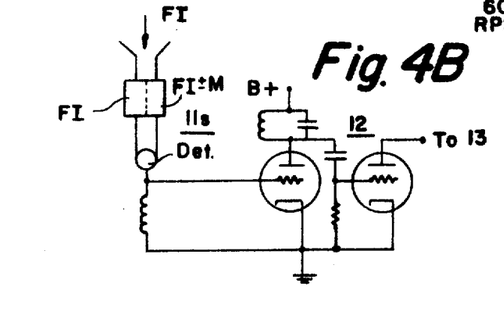
Figure 4C:
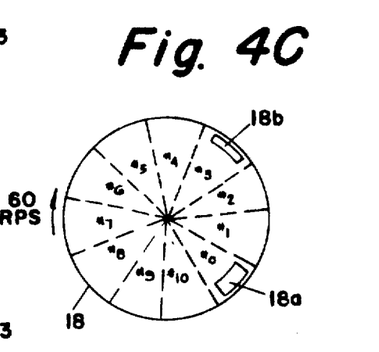
FIG. 4C is a front view of the timing disc shown in FIG. 4.

The master station thus produces two microwave frequencies, for example FI, FI+M, separated by the modulation-frequency M (say 60 mc.); and the slave station produces two different microwave frequencies, for example FII, FII+M, separated by exactly the same modulation-frequency, this modulation-frequency being phase-locked for the two transmitters. By thus concentrating the output energy at the carrier frequency and a single sideband, this arrangement permits the use of parallel filters in the receiving antenna—separated by the modulation-frequency M, and thus it minimizes the frequency spectrum required for the system.

A time-separation arrangement is used to distinguish the modulation signals from the pair of transmitters for a particular range. The antenna-feed waveguide 80 of each transmitter (FIG. 4) has a transverse slot 81 fitted with a perforated timing disc 18 which is driven by a synchronous motor 19. Assuming that all transmitters in the system are powered from a common 60 c.p.s. source, the discs for all transmitters in the system can be synchronized by adjustable phase shifters 82 on the input to each of these motors. If a common A.C. power source is not available for the whole system, synchronization of the modulation pulses can be achieved by a separate radio or telephone circuit between the transmitters. The openings 18a, 18b (FIG. 4C) in the 60 r.p.m. timing disc 18 are arranged to permit passage to the antenna 83 of a high-powered pulse, for example of 1 millisecond duration, at the beginning of each revolution 18a followed, and at a distinctive sector later in the revolution, by passage of a low-powered (1 millisecond) pulse. In the disc 18 of FIG. 4C, sector #3 is provided with the low-power slot 18b and so identifies signals of the range 7 of FIG. 1. A circulator and dummy load 17 are provided to absorb the transmitter energy during the non-transmission sectors of the timing cycle. The high-powered pulses synchronize timing devices in the shipboard receiver-indictors. The low-powered pulses, transmitted and received during that sector of the 60 c.p.s. timing cycle that has been designated as the characteristic for that particular range, provide the phase-relationship information required by vessels on that range to determine their speed, progress and offset. The 16.667 millisecond timing cycle and 1 millisecond pulses established by this example permit selection of any one of ten different timing characteristics—with a substantial .515 ms. separation between information pulses having adjoining characteristics. Since the information-pulse timing characteristics will thus be repeated only after ten ranges, interference between ranges with the same timing characteristic is minimized or eliminated.

The same timing characteristic applies to both the master station and slave station on each range. The transmitter circuit for the associated slave station is identical to that described above except that the carrier is at a different carrier frequency FII and the oscillator 11m (FIG. 4A) is replaced by a directional antenna and receiver-detector-amplifier 11s (FIG. 4B) which picks up the microwave signal from the master station and takes off the envelope to modulate the slave station's microwave output with a wave M that is phase-locked to the modulation M of the master station.

Figure 3:
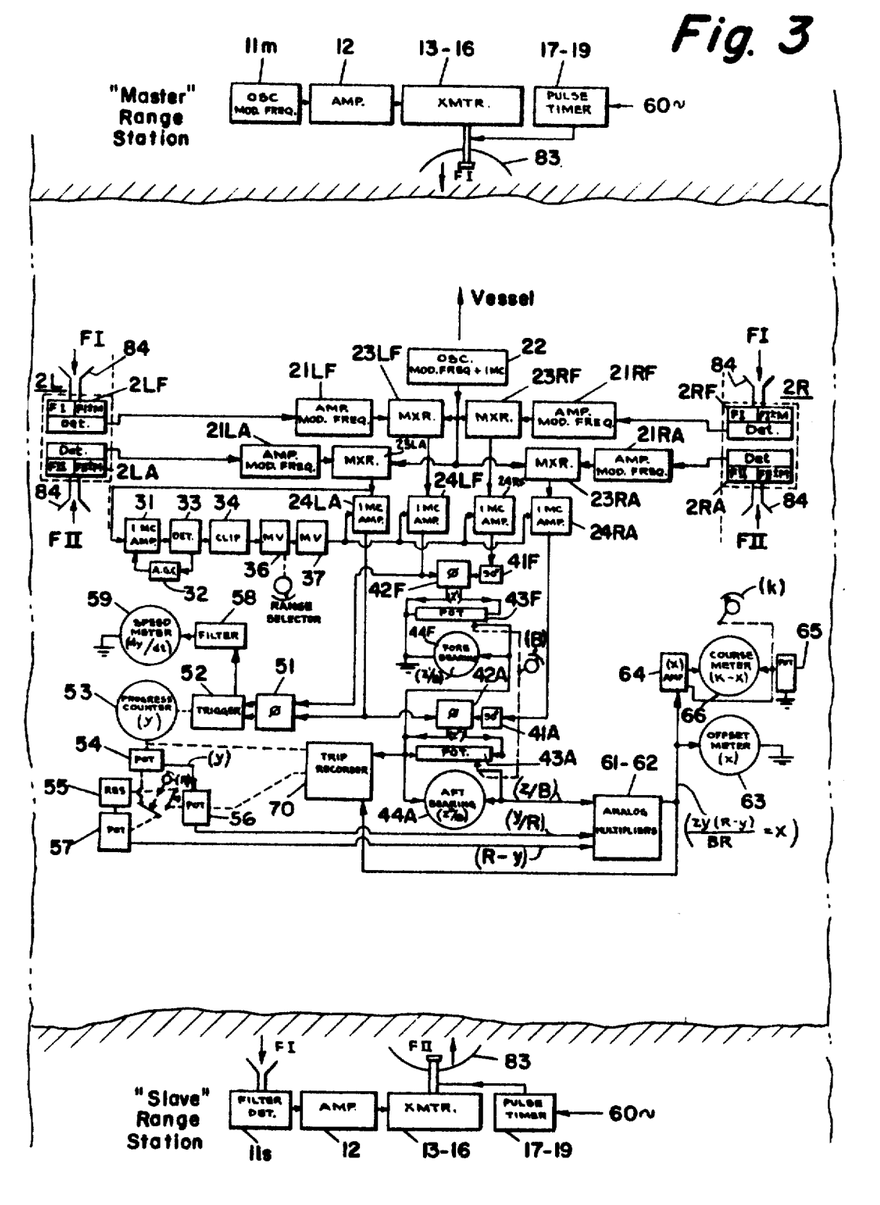
FIG. 3 is a block diagram showing the principal components of the radio range stations and shipboard radio receiver-indicator.

The receiver-indicator equipment on the vessel's bridge may be either portable or fixed and (FIG. 3) involves six main elements:

(1) The antenna-filter-detector pairs 2LF, 2LA; 2RF, 2RA;
(2) The bearing meters 44F, 44A—fed by both bridge-wing antenna pairs 2LF, 2RF and 2LA, 2RA through amplifiers and mixers and actuated by phase comparators 42F, 42A and potentiometers 43F, 43A;
(3) The progress counter 53—fed by one bridge-wing antenna pair, for example, 2LF, 2LA, through amplifiers and mixers and actuated by a phase comparator 51 and trigger 52;
(4) The speed meter 59—fed by the trigger 52 and actuated by a filter 58;
(5) The offset meter 63—fed by both bridge-wing antenna pairs through the bearing and distance phase-comparators 42F, 42A, 51 and potentiometers 43F, 43A, 54, 56, 57 and actuated by analog multipliers 61, 62; and
(6) The course-keeping meter 66—fed by the analog multipliers 61, 62, and amplifier 64 and potentiometer 65.

The antenna-filter-detector units 2LF, 2LA, 2RF, 2RA are located on the wings of the bridge (two units 2LF, 2RF facing forward and two units 2LA, 2RA facing aft): the units 2LF, 2LA are on the left or port wing of the bridge and the units 2RF, 2RA are on the right or starboard wing. Each of the receiving antennas 84 is a stub or small directional horn. To eliminate microwave plumbing, each antenna signal is fed directly into parallel cavity filters (one tuned to the carrier frequency and the other to the carrier frequency plus or minus the modulation-frequency M) and thence into a detector for the modulation-frequency M.

Figure 5:
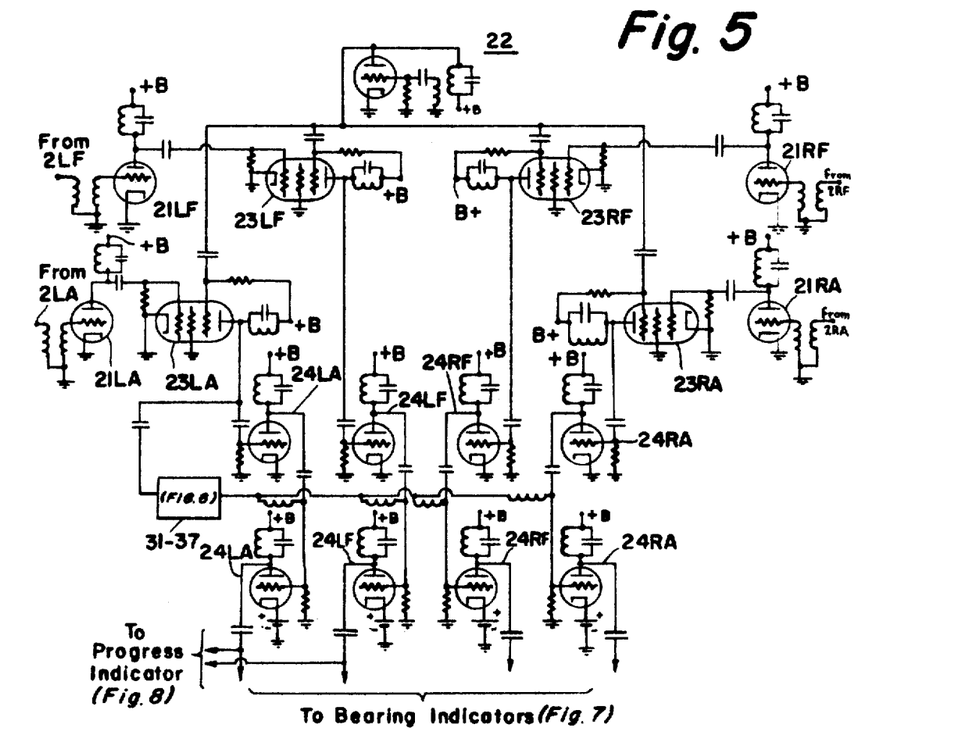
FIG. 5 schematically illustrates suitable circuit elements of amplifier units in the radio receiver-indicator.
Figure 6:
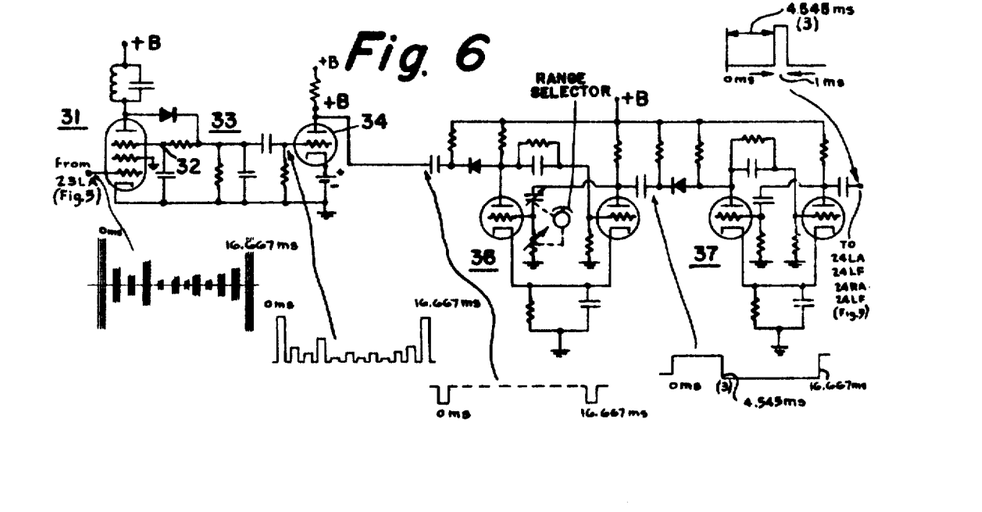
FIG. 6 schematically illustrates suitable circuit elements of the receiver timer unit in the radio receiver-indicator.

The detected signals are sine waves (say 60 mc.) representing the sideband separation in the $x$-band or $k$-band energy (at different frequencies) from the forward and rear radio-range stations. These signals from each of the four detectors are brought in, as by light coaxial cable, from the bridge wings to the indicator box in the pilot house 1 and respectively fed through the corresponding tuned amplifiers 21RF, 21RA, 21LF, 21LA into the (1 mc.) mixers 23RF, 23RA, 23LF, 23LA (FIGS. 3 and 5). The other input to the four mixers is from a stabilized local oscillator 22 tuned 1 mc. above the modulation-frequency. The output of the mixers is four 1-mc. sine waves which have the same phase relationship to each other as the modulation of the signals received by the four antennas on the vessel.

As a result of the 60 c.p.s. time-separation arrangement in the pairs of range station transmitters, these mixer outputs consist of a high-powered 1-millisecond synchronizing pulse every 16.667 milliseconds followed by a series of low-powered 1-millisecond information pulses with a .515-ms. separation between pulses. In order to measure the pertinent phase relationships in the 1-mc. energy which comprises these pulses, it is necessary to distinguish the information pulses for that particular range from the pulses for neighboring ranges. For this purpose, a mixer output is put through a (1-mc.) amplifier 31 (FIGS. 3 and 6) with automatic gain control 32 and into a detector 33 which takes off the envelope of the 1-ms. pulses and feeds it through a clipping circuit 34 to two monostable multivibrators 36, 37. The first multivibrator 36 has variable timing for its return to the quiescent state—adjustable in ten even steps from 1.515 to 15.152 milliseconds following commencement of the synchronizing pulse. The second multivibrator 37, triggered by the first multivibrator's return to the quiescent state, produces a 1-ms. positive period. This is used as a gate for the second stage of each of the four separate 1-mc. amplifiers and amplitude limiters 24LA, 24LF, 24RF, 24RA in the receiver (FIGS. 3 and 5), permitting them to pass only the 1 millisecond information pulses with the timing characteristic for which the first multivibrator 36 (FIG. 6) has been set. With this arrangement and with the appropriate setting of the shipboard timer 31–37, the signals provided to the various indicator units are restricted to the 1 millisecond information pulses from the transmitters for that particular range.

For the bearing indicator circuit (FIGS. 3 and 7), the signals from the amplifiers 24LF, 24RF for the left and right forward-pointing antennas 2LF, 2RF (with either the left or right signal passed through a 90° phase adjuster 41F) are fed into a balanced-modulator phasemeter 42F (see Terman and Pettit, Electronic Measurements, McGraw-Hill (1952), p. 273). The phasemeter output is applied to a hyperbola-tapered potentiometer 43F, the take-off of which is set by hand for the distance B between the vessel's receiving antennas and thus produces a voltage which represents the $z'/B$ element defined above.

Figures 7, 8:
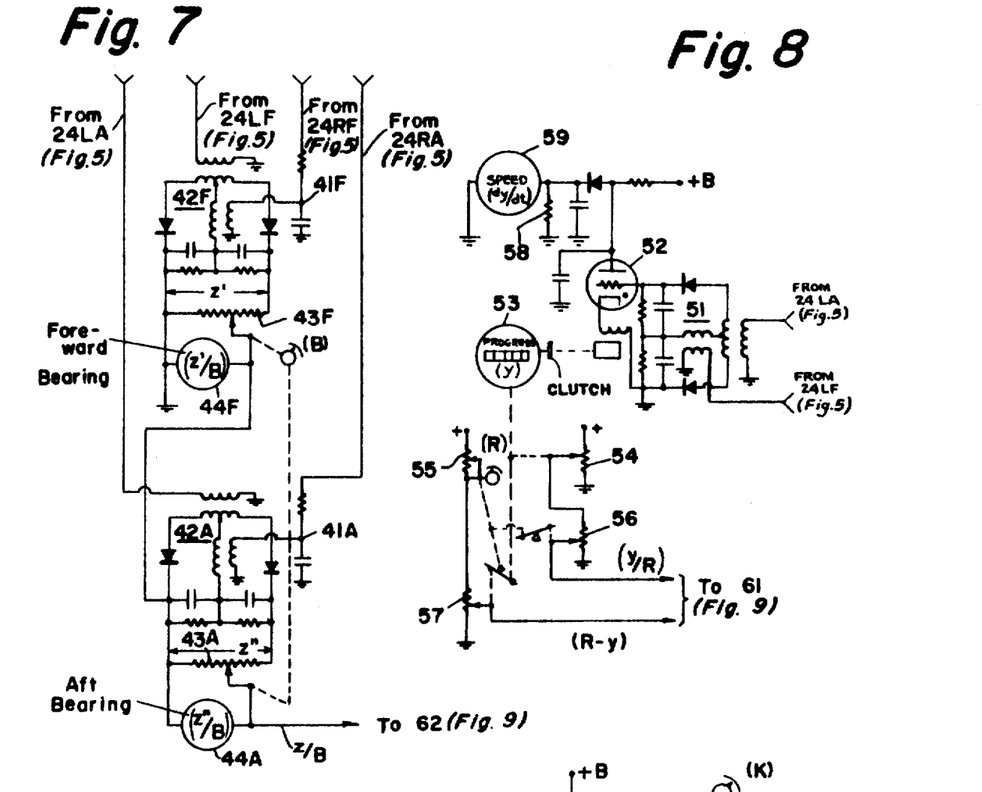
FIG. 7 schematically illustrates suitable circuit elements of the bearing indicator unit in the radio receiver-indicator.
FIG. 8 schematically illustrates suitable circuit elements of the speed and progress indicator unit in the radio receiver-indicator.

This voltage is applied to a sine-wound zero-centered meter 44F to indicate the relative bearing of the forward range station. The signals from the amplifiers 24LA 24RA for the left and right aft-pointing antennas are fed through a similar phase-shifter 41A, phasemeter 42A and potentiometer 43A (mechanically coupled to potentiometer 43F) to provide the $z''/B$ element for the aft-bearing meter 44A.

For the progress and speed indicator circuitry, the output of the amplifiers 24LF, 24LA for the forward-pointing and aft-pointing left antennas 2LF, 2LA are the inputs for a third balanced-modulator phasemeter 51 (FIGS. 3 and 8). With the ship's movement along the range, as explained above, the modulated wave from the master station moves successively into and out of phase with the "reflected" wave from the slave station (the two waves having a fixed relationhip by reason of the receiver-modulator phase-lock feature of the slave station described aobve); and the output voltage of the phasemeter 51 will thus reach a positive peak for each successive half-wavelength of ship travel. This peak fires a thyratron or similar trigger 52 which energizes an actuating solenoid for a Veeder-Root counter 53 to indicate the ship's progress in either direction along the range from the point at which the counter was reset to zero. The sawtooth recovery wave of the thyratron plate 52 (with a time constant for the plate resistor and grounded capacitor substantially greater than the time between peaks) is fed through a diode and R.C. filter circuit 58 to a D.C. voltmeter 59 (with reversed winding) to indicate the vessel's true speed.

One output to the offset indicator circuit can be produced (FIGS. 3 and 8) by inversely coupling the progress counter 53 to a potentiometer 57 supplied from a fixed D.C. source through a variable resistor 55 which can be set by hand for the interstation distance R of the range being navigated. The take-off from the potentiometer represents $R-Y$. The R setting also adjusts the fulcrum in the inverse coupling so that the $y$ and $R-y$ values are properly correlated for each range.

Another output for the offset indicator circuit (FIGS. 3 and 9) can be produced by mechanically coupling the progress counter 53 to a second potentiometer 54 (FIGS. 3 and 8) fed from a fixed D.C. source and feeding the take-off (which represents $y$) to a third (hyperbolatapered) potentiometer 56 which is inversely coupled to the variable resistor 55 representing R. The take-off of this potentiometer 56 represents $y/R$. The lower end of potentiometers 54 and 57 can be wound with a sine taper to compensate for errors of approximation in the offset equation $yz(R-y)/RB$ which would otherwise result from the large relative bearings at the ends of the range.

The remaining required input to offset-indicator 63 is the $z/B$ element; this can be provided by linking together for algebraic addition the $z'/B$ and $z''/B$ elements from the bearing indicator circuit as shown in FIG. 7.

Figure 9:
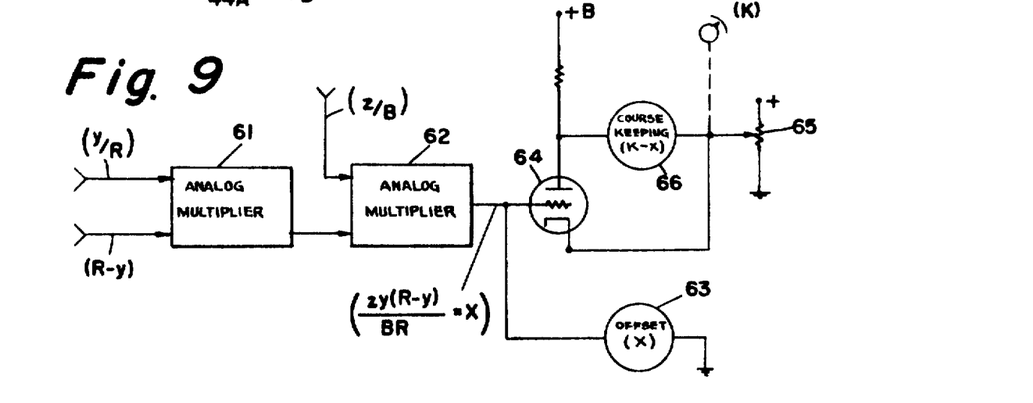
FIG. 9 schematically illustrates suitable circuit elements of the offset indicator and course-keeping unit in the radio receiver-indicator.

The $R-y$ and $y/R$ elements are the inputs to an analog multiplier 61 (FIGS. 3 and 9) which provides the product $y/R(R-y)$. (See Korn and Korn, Electronic Analog Computers, 2nd ed., McGraw-Hill (1956), and I.R.E. Transactions on Electronic Computers, March 1958, design by H. Schmid.) This $y/R(R-y)$ output and the above $z/B$ elements are the inputs for a second analog multiplier 62 which produces the final D.C. voltage $$\frac{y}{R}\frac{z}{B}(R-y)=x$$

to actuate the offset indicator meter 63. For all meters described, it is assumed that the inertia of the meter needle will remove any vibration from the 60 c.p.s. information pulse repetition frequency and that the full-cycle (16.667 ms.) meter reading will reflect the phase-relationships determined during the 1-ms. information pulse. A small filter can be used to assure this when found necessary.

The $x$ voltage from the computer 62 (FIGS. 3 and 9) can be applied through an amplifier 64 to one side of a reverse-wound zero-centered meter 66, with the other side connected to the take-off of a fixed-D.C.-fed potentiometer 65 which is also connected to the amplifier cathode and set by hand for the desired value of $x$ (the established distance K between the channel center line and the lane center line). This course-keeping meter 66 will thus show the direction the vessel must turn in order to achieve or maintain the desired offset.

The above-described progress, range-selection, bearing and offset information can, when desired, be coupled or fed into a trip recorder 70 (FIG. 3) to maintain a permanent log of the vehicle's position and action at all times during transit of a channel.

The required accuracy in this system will depend upon the channel characteristics: range length, beacon locations, channel width, and desired separation between opposing ship lanes—and the offset information must be adequate for safe navigation at the center of the range.

For example, with a range length of 4,000 yards, beacons located 1,000 yards beyond each end of the range, a vessel beam (distance between receiving antennas) of 20 meters, a 60-mc. modulation-frequency, and a total circuit (including balanced-modulator phasemeters) capable of producing discernible voltages for phase differences of as little as 1°, the progress counter will register advances of 2½ yards and the offset meter can register lateral changes in the ship's position of as little as one yard.

For longer ranges or narrower channels, any desired accuracy of the system can be achieved by increasing the sensitivity of the phasemeters or by using harmonics of the 1-mc. intermediate frequency for the phase comparisons. The accuracy can be further improved at the ends of the ranges by using separate pairs of range stations for the incoming and outgoing lanes (as indicated by the dotted range station locations 4a, 5a; 4b, 5b in FIG. 1). In this arrangement, the vessel navigates so as to adhere directly to the interstation (zero offset) line 6a or 6b depending upon whether it is outbound or inbound. In all cases, of course, the forward-pointing receivers of the vessel are tuned to the fore-range station and the rear-pointing antennas are tuned to the aft-range station: most simply, the bridge equipment can be changed over for progress of the vessel in opposite direction merely by rotating the bridge-wing antennas through 180°.

If desired, the time-separation units in the transmitters and receivers as described above can be eliminated and the distinction between transmitter signals for the various ranges achieved by the use of several different microwave frequencies (instead of just two frequenices as required above). In this arrangement, a selection of microwave filters can be employed in the bridge-wing antenna receivers to discriminate between transmitter signals; and the pattern of transmitter frequency assignments can be repeated every few ranges (with enough distance between transmitters of the same frequency to avoid serious interference).

All of the features of this system, with the time-separation arrangement, are readily adaptable to aircraft operations. Here, the ranges can be established by pairs of radio stations on the ground in line with the flight path; and the receiving antennas can be in each wingtip of the aircraft, with the indicator box in the cockpit. By mounting additional receiving antennas under the fuselage and at the top of the tailfin, a continuous indication of aircraft altitude can also be provided.

The principles of this same basic system are applicable to an underwater sound arrangement for submarine or surface navigation.

Figures 10, 11:
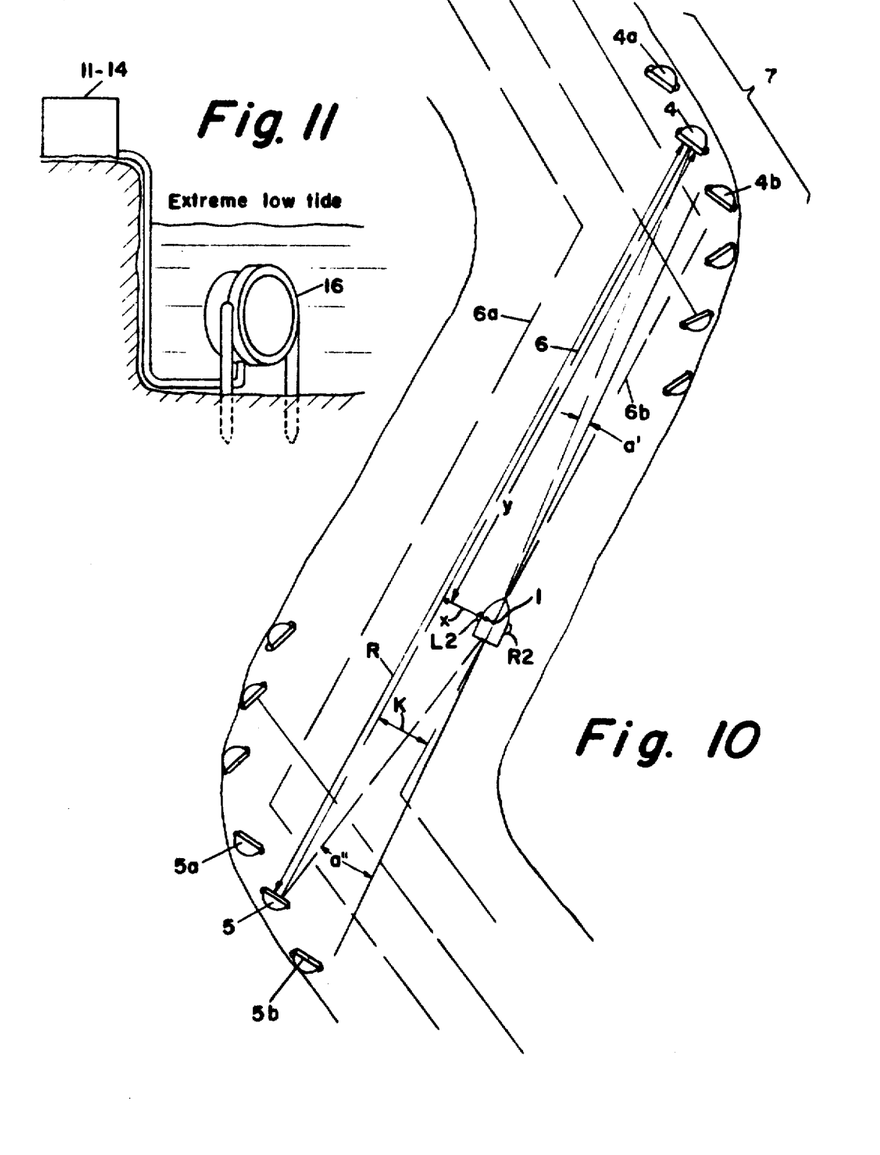
FIG. 10 is an explanatory figure referred to in discussion of the geometric relationship between vessel position and underwater sound beacon locations for a typical channel range.
FIG. 11 illustrates a typical underwater sound beacon installation.

Referring to FIG. 10 and using the same number identification as in FIGS. 1 and 2, the method and system are similar to that described above for the radio arrangement with the following system modifications:

(a) The range stations 4, 5 are now sound beacons located under the water surface along the extended channel center line 6 at each end of the range. In a possible alternative, as indicated above and as shown by the beacon locations 4a, 5a, 4b, 5b, separate pairs of beacons may be employed for the incoming and outgoing lanes 6a, 6b. For offshore navigation, the beacons can take the form of battery-powered or nuclear-powered buoys, anchored so that they float at a convenient depth below the surface.

(b) The receiving antennas L2, R2 are pairs of soundheads located below the water line on each side of the vessel.

(c) The modulating of a carrier frequency is eliminated and the sonic beacon frequency is used directly for information purposes aboard the vessel.

(d) Bearing determinations can be made either by a phase comparison or by a pulse-arrival-time comparison (in which the z factor is produced by multiplying the existing velocity of sound in water by the algebraic sum of the intervals between pulse arrival on each side of the vessel from the forward and rear beacons).

(e) In this arrangement, speed and progress determinations are made by a succession of pulse-arrival-time comparisons.

(f) The frequency-separation principle for distinguishing between beacon signals (described above as a possible alternative in the radio arrangement) is used because low pulse velocities make the time-separation principle impractical under water.

(g) The circuits provide corrections for changes in the velocity of sound in water due to changes in temperature and salinity.

Figure 12:
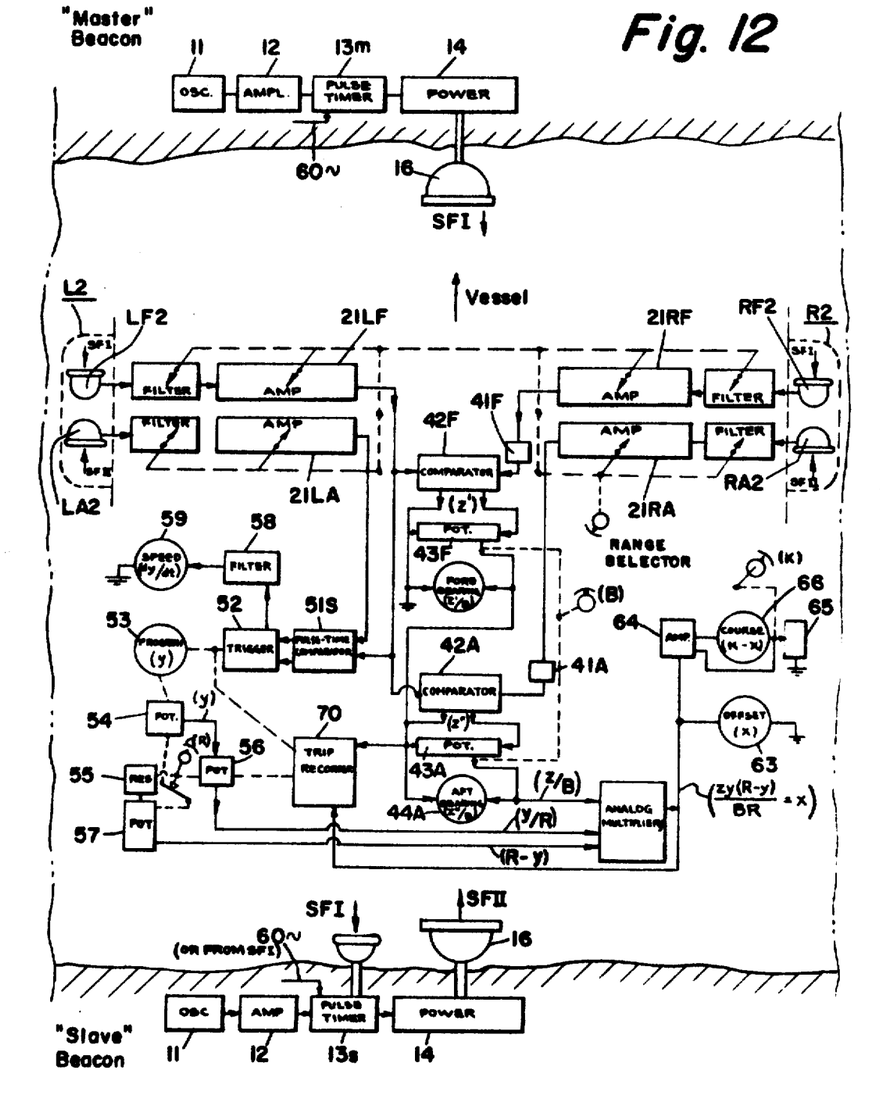
FIG. 12 is a block diagram showing the principal components of the underwater sound beacons and shipboard receiver-indicators.

Referring to FIGS. 11 and 12 for a description of suitable means for operating this underwater sound arrangement:

Each beacon signal originates with an oscillator 11 and amplifier 12 (FIG. 12) at a distinctive sonic frequency. This signal is pulsed at a selected reference rate by a timer (for example by a sector contact on a synchronous-motor-driven wheel), with the timers 13m, 13s for each pair of beacons synchronized by a common power source. For offshore applications where each beacon may have its own power source, the timing relationship between beacon signals can be achieved through a master-slave arrangement with a receiver-amplifier 13s serving as the pulse timer for the slave beacon.

The sonic pulses are supplied through a power amplifier 14 and an underwater cable to the transducer 16 which may be fixed to the bottom below the extreme low tide level (FIG. 11) and oriented with the beam along the channel center line 6 (or lane center line if separate beacon pairs 4a, 5a, 4b, 5b are used for the incoming and outgoing lanes 6a, 6b).

In order to permit clear discrimination among signals, the beacons in the same general neighborhood operate at different sonic frequencies; but frequencies can be repeated every few ranges without serious interference.

The signals are received aboard ship by streamlined double-ended sound heads L2, R2 fixed to each side of the hull. A pair of cables from each side leads to the indicator unit which can be located in the pilot house or conning tower.

The indicator elements (FIG. 12) are similar in concept to those described above for the radio arrangement (FIGS. 3 and 7–9) but with the following differences:

(a) The circuit components are designed for sonic frequencies.

(b) The local oscillator and intermediate frequency are thus omitted.

(c) Signal selection is accomplished by adjustable filters coupled with tuned amplifiers 21LF, 21RF, 21LA, 21RA, with distinctive settings for the frequencies of each pair of beacons.

(d) The receiver timer is omitted.

(e) The phase comparator in the speed and progress circuit is replaced with a pulse-arrival-time comparator 51S. A suitable circuit is shown in FIG. 9 of Rich Patent No. 2,530,631 dated November 21, 1950—assuming components adapted to the selected pulse repetition rate and with an adjustment for underwater sound velocity as determined by water temperature and salinity. This circuit will "cycle" as the vessel advances a distance equal to the interval between pulses times one-half the existing velocity of sound in water; and successive voltage increments during the cycle can be used to trigger the counter 53 in steps comparable to the "in-phase" steps in the phase-comparator circuit 51 described above.

(f) The phase comparators 42F, 42A in the bearing circuits can be replaced with pulse-arrival-time comparators, in which case the phase-shifters 41F, 41A are omitted. The Rich circuit can also be applied here—with its components adapted to typical values of $z'$ and $z''$ and with resistors adjustable for existing water temperature and salinity. If phase-comparators are used, it will still be necessary to make a resistor adjustment for the existing velocity of sound in water.

This underwater sound arrangement is particularly impressive in the accuracy of the location information which it provides. For example: assuming a range length of 4,000 yards (with beacons 500 yards from each end of the range), a spacing between receivers (vessel beam) of 20 meters, a beacon frequency of 10,000 c.p.s., a velocity of sound in water of 5,000 feet per second, and phasemeters of 1° sensitivity, the offset indicator can theoretically register lateral changes in the ship's position of as little as one inch. With these same characteristics but with the use of pulse-arrival-time comparators and a circuit capable of discerning differences of as little as 1 $\mu$s., the offset indicator can theoretically register lateral changes in the ship's position of as little as four inches.

These high orders of accuracy make this underwater sound arrangement particularly advantageous in offshore submarine navigation where long ranges are desirable for economy and ease of operation. With the above parameters but with a ten-mile range, for instance, the offset indicator would register lateral changes of as little as four inches—using phase-comparators.

What is claimed is:

1. A method of determining on board a vehicle its location, attitude and speed with respect to fore and aft range stations which comprises radiating from said range stations signals having a time-locked characteristic, comparing the time-relationship of the signals from said stations as received at laterally spaced points between or on opposite sides of said vehicle to determine the relative bearing of each range station, counting and timing the occurrences of a predetermined time-relationship of the signals as received from said stations to determine its distance from said range stations and the true speed of said vehicle, and combining the distance information and the algebraic sum of the simultaneous relative bearing information to determine the lateral offset of said vehicle with respect to the base line between said range stations.

2. A method of determining on board a vehicle the simultaneous relative bearings of fore and aft range stations which comprises radiating from said range stations signals having a time-locked characteristic, and comparing the time-relationship of said signals as received at laterally spaced points between or on opposite sides of the vehicle to determine the relative bearing of each of said range stations.

3. A method of determining on board a vehicle its lateral offset with respect to the base line between fore and aft range stations which comprises radiating from said range stations signals having a time-locked characteristic, comparing the time relationship of the signals from said range stations as received at laterally spaced points between or on opposite sides of said vehicle to provide relative bearing information with respect to each of said stations, counting the successive occurrences of a predetermined time-relationship between the signals of said stations as received on the vehicle to provide distance information, and combining the distance information and the algebraic sum of the bearing information for each of said stations to determine the lateral offset of the vehicle from said base line.

4. A method of determining on board a vehicle its location, attitude and speed with respect to fore and aft above-ground range stations which comprises radiating from said stations radio waves of respectively different carrier frequencies but which have a common phase-locked modulation frequency, comparing the instantaneous phase-relationship of the modulation frequency of said carrier frequencies as received at laterally spaced points between or on opposite sides of said vehicle simultaneously to determine the relative bearing of each station, counting and timing the occurrences of successive in-phase relationship of the phase-locked modulation from the fore and aft stations during progress of the vehicle to determine its distance from said stations and its true speed with respect thereto, and combining the distance information and the algebraic sum of the relative-bearing information to determine the lateral offset of the vehicle with respect to the base line between said stations.

5. A method of determining on board a vehicle the simultaneous relative bearings of fore and aft range stations which comprises radiating from said stations radio waves of respectively different carrier frequencies but which have a common phase-locked modulation frequency, and comparing the instantaneous phase relationship of the phase-locked modulation of said carrier frequencies as received at laterally spaced points between or on opposite sides of said vehicle.

6. A method of determining on board a vehicle its lateral offset with respect to the base line between fore and aft range stations which comprises radiating from said stations radio waves of respectively different carrier frequencies having phase-locked modulation of the same frequency, comparing the instantaneous phase-relationship of the modulation frequency of said carrier frequencies as received at laterally spaced points between or on opposite sides of said vehicle to provide relative bearing information, counting the occurrences of successive in-phase relationship of the phase-locked modulation of the received carrier frequencies to provide distance information, and combining said distance information and the algebraic sum of the relative bearing information for said stations to determine the lateral offset of the vehicle with respect to the base line between said stations.

7. A method of determining on board a vessel its location, attitude and speed with respect to fore and aft underwater beacons which comprises radiating synchronized pulses of audio-frequency energy from said beacons, comparing the arrival times of pulses from both beacons as received at laterally spaced points between or on opposite sides of the vessel simultaneously to determine the relative bearing of each beacon, during continuous progress of the vessel, counting and measuring the time interval between the successive coincidences of arrival time of pulses from the fore and aft beacons to determine its distance from and the speed with respect to the beacons, and combining the distance information and the algebraic sum of the bearing information to determine the lateral offset of the vessel with respect to the base line between the beacons.

8. A method of determining on board a vessel the relative bearings of fore and aft underwater beacons which comprises radiating synchronized pulses of audio-frequency energy from said beacons, and comparing the arrival time of pulses from both beacons as received at laterally spaced points between or on opposite sides of the vessel simultaneously to determine the relative bearing of each beacon.

9. A method of determining on board a vessel its distance from fore and aft underwater beacons and its speed with respect to said beacons which comprises radiating synchronized pulses of audio-frequency energy from said beacons, and during continuous progress of the vessel, counting and measuring the time interval between successive coincidences of arrival time of pulses from the fore and aft beacons.

10. A method of determining on board a vessel its lateral offset with respect to the base line between fore and aft underwater beacons which comprises radiating synchronized pulses of audio-frequency energy from said beacons, comparing the arrival times of pulses from both beacons as received at laterally spaced points between or on opposite sides of the vessel to provide the relative bearing information for each of said beacons, during continuous progress of the vessel, counting the successive coincidences of arrival time of pulses from the fore and aft beacons to provide distance information, and combining the distance information and the algebraic sum of the bearing information for both beacons as a measure of the lateral offset of the vessel with respect to the base line between the fore and aft beacons.

11. A channel-navigation system comprising at least one pair of fore and aft range stations having means for radiating signals having a time-locked characteristic, a pair of signal-receiving means at each of two laterally spaced points between or at opposite sides of a vehicle for receiving the signals from the fore and aft stations of a channel range, means on board said vehicle for comparing the time-relationship of the received signals as a measure of the relative bearing of said fore and aft range stations, means on board said vehicle for counting the occurrences of a predetermined time-relationship of the received signals as a measure of change in distance of the vehicle from said stations, means on board said vehicle for timing the interval between successive occurrences of said predetermined time-relationship of the received signals as a measure of the true speed of the vehicle, and means for combining the distance information and the algebraic sum of the relative bearing information as a measure of the lateral offset of the vehicle with respect to the base line between said fore and aft stations.

12. A channel-navigation system comprising at least one pair of fore and aft range stations having means for radiating signals having a time-locked characteristic, a pair of signal-receiving means at each of two laterally spaced points between or at opposite sides of a vehicle for receiving the signals from the fore and aft stations of a channel range, and means on board said vehicle for comparing the time-relationship of the received signals as a measure of the relative bearings of said fore and aft range stations.

13. A channel-navigation system comprising at least one pair of fore and aft range stations having means for radiating signals having a time-locked characteristic, two pairs of signal-receiving means on board a vehicle, the pairs being respectively disposed on opposite sides of the vehicle and each pair respectively receiving signals from the fore and aft stations of a channel range, means on board the vehicle for comparing the time-relationship of the signals as received at laterally spaced points between or on opposite sides of the vehicle from each of said stations as a measure of the relative bearing of each of said stations, means on board the vehicle for counting the occurrences of a predetermined time-relationship between the signals from said stations as received by one pair of said signal-receiving means as a measure of the distance to said stations, and means on board the vehicle for combining the distance information and the algebraic sum of the bearing information as a measure of the lateral offset of the vehicle from the base line between said fore and aft stations.

14. A channel-navigation system comprising at least one pair of fore and aft radio range stations operating at different carrier frequencies and having a common phase-locked modulation frequency, two pairs of radio-receivers respectively disposed at laterally spaced points between or on opposite sides of a vehicle, one receiver of each pair being tuned to the fore station and the other to the aft station, means on board the vehicle for comparing the phase-relationship of modulation from each station as received by the correspondingly tuned receivers at said laterally spaced points to produce bearing signals respectively representative of the relative bearings of said stations, indicating means respectively responsive to said bearing signals, means responsive to the occurrences of a predetermined phase-relationship of the modulation from the pair of stations as received at one of said laterally spaced points to produce distance signals, indicating means responsive to said distance signals, means for combining said distance signals and the algebraic sum of said bearing signals to produce signals representative of the lateral offset of said vehicle with respect to the base line between the fore and aft stations, and indicating means responsive to said offset signals.

15. A channel-navigating system comprising at least one pair of fore and aft radio-range stations operating at different carrier frequencies and having a common phase-locked modulation frequency, two pairs of radio-receivers respectively disposed at laterally spaced points between or on opposite sides of a vehicle, one receiver of each pair being tuned to the fore station and the other to the aft station, means on board the vehicle for comparing the phase-relationship of modulation from each station as received by the correspondingly tuned receivers at said laterally spaced points to produce bearing signals respectively representative of the relative bearings of said stations, and two indicating means respectively responsive to said signals, one to display the relative bearing of the aft station and the other to display the concurrent relative bearing of the fore station.

16. A channel-navigating system comprising at least one pair of fore and aft radio-range stations operating at different carrier frequencies and having a common phase-locked modulation frequency, two pairs of radio-receivers respectively disposed at laterally spaced points between or on opposite sides of a vehicle, one receiver of each pair being tuned to the fore station and the other to the aft station, means on board the vehicle for comparing the phase-relationship of modulation from each station as received by the correspondingly tuned receivers at said laterally spaced points to produce bearing signals respectively representative of the relative bearings of said stations, means on said vehicle responsive to occurrences of a predetermined phase-relationship of the modulation output signals from one pair of said receivers to produce distance signals, and indicating means responsive jointly to the distance signals and the algebraic sum of the bearing signals for displaying the lateral offset of the vehicle with respect to the base line between said station of a pair.

17. A channel-navigating system as in claim 16 additionally including means preset to provide a reference signal representative of a desired offset from the base line, and indicating means responsive to the difference between said reference signal and the signals applied to the offset indicating means.

18. A channel-navigation system comprising at least one pair of fore and aft underwater sound range stations for radiating time-locked sonic pulses, two pairs of sonic receivers respectively disposed at laterally spaced points between or on opposite sides of a vehicle, one receiver of each pair being responsive to pulses from the fore station and the other to pulses from the aft station, means on board the vehicle for comparing the arrival time of pulses from each station of the pair as received at said laterally spaced points to produce bearing signals respectively representative of the relative bearings of said stations, indicating means respectively responsive to said bearing signals, means responsive to coincident arrival of pulses at one pair of sonic receivers to produce distance signals, progress indicating means responsive to said distance signals, means responsive jointly to said distance signals and the algebraic sum of said bearing signals to produce signals representative of the lateral offset of said vehicle with respect to the base line between said pair of range stations, and indicating means responsive to said offset signals.

19. A channel-navigation system comprising at least one pair of fore and aft underwater-sound range stations for radiating time-locked sonic pulses, two pairs of sonic receivers respectively disposed at laterally spaced points between or on opposite sides of a vehicle, one receiver of each pair being responsive to pulses from the fore station and the other to pulses from the aft station, means on board the vehicle for comparing the arrival time of pulses from each station of the pair as received at said laterally spaced points to produce bearing signals respectively representative of the relative bearings of said stations, and two indicating means respectively responsive to said signals, one to display the relative bearing of the aft station and one to display the concurrent relative bearing of the fore station.

20. A channel-navigation system comprising
at least one pair of fore and aft underwater-sound range stations for radiating time-locked sonic pulses,
a pair of sonic receivers disposed on a vehicle and respectively responsive to pulses from the fore and aft stations of the channel-range being navigated,
means responsive to coincidence of arrival time at said receivers of pulses from said stations to produce a distance signal, and
register means responsive to the distance signals for indicating progress of the vehicle.

21. A system as in claim 20 additionally including means responsive to the interval between successive distance signals for indicating the true speed of the vehicle.

22. A channel-navigation system comprising
at least one pair of fore and aft underwater-sound range stations for radiating time-locked pulses,
two pairs of sonic receivers respectively disposed at laterally spaced points between or on opposite sides of a vehicle, one receiver of each pair being responsive to pulses from the fore station and the other to pulses from the aft station,
means on board the vehicle for comparing the arrival time of pulses from each station of a pair as received at said laterally spaced points to produce bearing signals respectively representative of the relative bearings of said stations,
means responsive to coincident arrival of pulses at one pair of the sonic receivers to produce distance signals, and
indicating means responsive jointly to the distance signals and the algebraic sum of the bearing signals for displaying the lateral offset of the vehicle with respect to the base line between the pair of stations.

23. A channel-navigating system as in claim 22 including means preset to provide a reference signal representative of a desired offset from the base line, and indicating means responsive to the difference between said reference signal and the signals applied to the offset indicating means.

References Cited by the Examiner

UNITED STATES PATENTS

| | | | |
|---|---|---|---|
| 684,706 | 10/1901 | Mundy | 340—6 X |
| 1,562,485 | 11/1925 | Affel. | |
| 2,050,276 | 8/1936 | Chubb. | |
| 2,364,625 | 12/1944 | Dugan | 343—112 X |

CHESTER L. JUSTUS, *Primary Examiner.*

R. E. BERGER, *Assistant Examiner.*